March 21, 1961

L. B. COURTOT 2,975,662

RING PRE-SET TOOL

Filed Sept. 8, 1958

INVENTOR.
LOUIS B. COURTOT

BY
RICHEY, McNENNY & FARRINGTON

ATTORNEYS

United States Patent Office 2,975,662
Patented Mar. 21, 1961

2,975,662
RING PRE-SET TOOL

Louis B. Courtot, Euclid, Ohio, assignor to The Weatherhead Company, Cleveland, Ohio, a corporation of Ohio Filed Sept. 8, 1958, Ser. No. 759,605
8 Claims. (Cl. 78—15)

This invention relates to a tool for pre-setting a cutting ring on a metal tube and more particularly to a tool for pre-setting rings, sometimes referred to as cutting rings. Rings of this type and their mode of operation are disclosed in United States Patent No. 2,139,413 to Hans Kreidel.

Tube couplings enjoying wide current use employ a metal cutting ring which, when assembled on the tube, shears up a shoulder on the outer wall of the tube and securely holds and seals the tube under high pressure. Such tube couplings have been made in accordance with the said Kreidel patent. Where thin-walled tubing is employed it is desirable that the tube be supported against collapse when the cutting ring is fixed on the tube. It is difficult or impossible to support such tubes where the ring is set while the tube is assembled with a valve body or the like.

Recent developments in the tube coupling art have resulted in the use of assemblies wherein the cutting ring is secured to the tube before the tube is assembled with a fixture at the point of use. For example, a manifold employing a number of metal tubes may have the free end of each tube provided with a cutting ring securely fixed in a predetermined position on the tube at the point of manufacture of the assembly. Such an assembly would then be shipped to the point of use. This insures uniformity in the set of the ring and minimizes errors occasioned by inexperienced labor. The present invention relates particularly to a tool for pre-setting such rings and one wherein the rings are accurately positioned and set into the tube and one wherein the tool will remain accurate throughout a long period of use.

It is among the objects of my invention to provide a pre-set tool for cutting rings comprising a cylindrical body portion of substantially uniform thickness which body is adapted to receive a removable cylindrical insert and wherein the insert portion is adapted to abut the end of a tube to be equipped with a ring.

Further objects and advantages relating to accuracy in use, support of the tube against collapse, low cost of manufacture, and long service life will appear from the following description and the appended drawings wherein.

Figure 1:
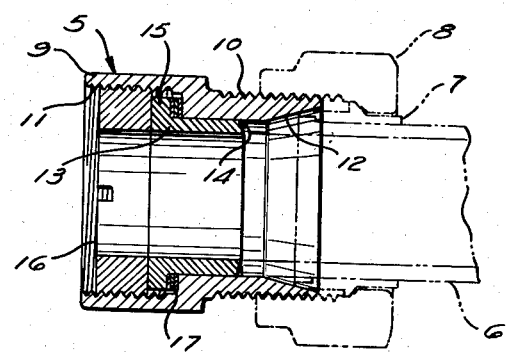
Fig. 1 is a sectional view of the tool with a tube having a ring and a nut shown in phantom outline prior to setting of the ring.

Referring to the drawings, the pre-set tool is indicated in its entirety as at 5, the tube which is to be coupled is indicated at 6, the ring at 7 and the nut as at 8. The pre-set tool comprises a cylindrical body 9 which is threaded as at 10 on its exterior at one end of the tool and as at 11 on its interior at the other end of the tool. One end of the body is provided with a conical mouth as at 12 so as to cause the forward end of the ring 7 to be reduced in diameter and at the same time force the cutting edge thereon into the tube. The tool includes a cylindrical insert 13 having a chamfered end face at 14 and a shoulder portion at 15 adapted to bear against a reduced diameter portion of the body 9. The wall of the insert is of the same thickness as the wall of the tube to be coupled. Thus different inserts are used for tubes having different thickness. A cylindrical nut 16 is received by the threads 11 in the body so as to force the insert 13 axially within the body and hold the annular shims 17 in place between the shoulder 15 on the insert and the reduced diameter of the body. The nut 16 and insert 13 have axial bores of the same diameter as the interior of the tube. This provides that a supporting mandrel 20 may be inserted to prevent the collapse of thin-walled tubes during assembly.

Figure 2:
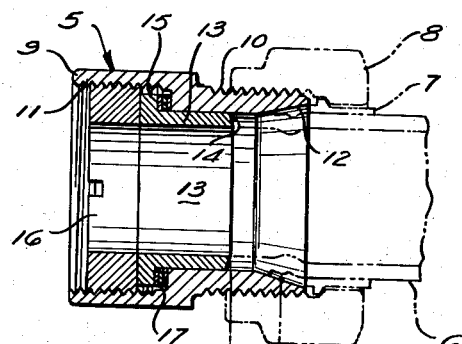
Fig. 2 is a view similar to Fig. 1 showing the nut drawn up on the pre-set tool so as to fix the ring in a predetermined position on the tube.
Figure 3:
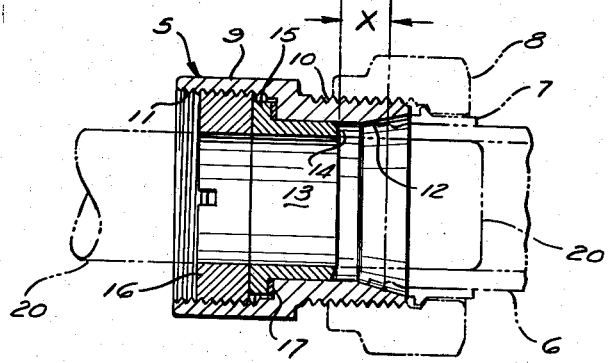
Fig. 3 is a view similar to Fig. 2 showing the position of the parts subsequent to a grinding or refinishing operation on the insert.

When the nut 8 is drawn up on the body 9, as shown in Fig. 2, the ring 7 is set into the tube 6 as shown. The end face of the tube in this assembly operation is forced against the end face of the insert which is chamfered as at 14. This results in an annular cut around the tool at a distance X from the end of the insert 13. Those skilled in the art will appreciate that it is important that all assemblies going out into the field for use should maintain an accurate dimension as at X between the end of the tube and the ring 7. It will be observed that the X dimension is controlled by the relationship between the end face 14 of the insert 13 and the conical mouth 12 on the body 9. When, due to wear on the end of the insert 13, as would be occasioned by pre-setting a large number of rings, the insert 13 is removed from the body 9 and the end face 14 is ground off to provide a smooth, new chamfered face. When, due to wear in the conical mouth 12, it is resurfaced or ground, this would also change the X dimension. The repeated resurfacing as at 14 reduces the axial dimension along the insert 13 and this change in dimension is compensated for by removing shims 17 as the axial extent of 13 is progressively reduced. If the conical mouth is resurfaced, shims 17 would be added. In this way the X dimension of the product is maintained constant throughout the life of the pre-set tool.

Another advantage obtained by the present construction is one relating to the heat treating and/or hardening of the metals of which the pre-set tool is made. Since the components of the pre-set tool, namely, the body 9, the nut 16 and the insert 13, are symmetrical and of substantially constant wall thickness, they may be heat treated without developing stress cracks characteristic of non-symmetrical shapes. Furthermore, the body, nut and insert may each be made of different alloys particularly suited for use to which the parts are subjected.

An example of a satisfactory ring pre-set tool includes the following characteristics: The body 9 is machined from an alloy steel of S.A.E. 8620 which is a manganese, nickel alloy. After the body is machined to approximate size and is threaded, it is heat treated by a gas carburizing process wherein the body is heated to a temperature of about 1650° C. in an atmosphere which is high in carbon. After cooling this is followed by heating to 1550° C. and quenching in oil. After the heat treatment on the body, the throat portion is finally ground to the correct dimension; that is, to provide the taper 12 as shown. This ground surface is characterized by the hardness of about 60 to 65 Rockwell whereas the core of the body may be characterized by the hardness of 40 to 45 Rockwell. It will be understood that the carburizing is a surface hardening process. The insert 13 and the nut 16 which backs up the insert are preferably made of S.A.E. 4140 alloy steel which is a chromium molybdenum alloy. The insert and nut are heated to about 1550° C. and quenched in oil and thereby hardened to about a 45 Rockwell. The Rockwell "C" scale is referred to here.

Although I have shown and described one form of my invention in considerable detail, it will be understood by those skilled in the art that numerous changes may be made therein without departing from the scope of the invention as defined in the following claims.

What is claimed is:

1. A ring setting tool for cutting rings comprising a generally cylindrical body, one end of said body being exteriorly threaded and said end having a conical mouth, a shoulder in the body spaced axially from said mouth, an insert having a generally cylindrical portion and an annular flange, said insert flange overhanging said shoulder on the interior of the body, shims between said flange and the shoulder on the tool body to position the insert within the tool body, and a nut carried by the tool body adapted to bear against the insert and press said shims against said shoulder.

2. A tool for setting cutting rings for metallic tube couplings, said tool comprising a cylindrical body exteriorly threaded at one end to receive the threads of a ring nut for moving the ring into the body, said tool body having a flaring conical mouth inside said threaded portion to reduce the diameter of the ring and cause the cutting edge thereof to enter the outer wall of the tube, said tool body having a shoulder spaced from said conical mouth, said tool body being interiorly threaded at the other end thereof, an insert within said body having a wall thickness corresponding substantially to the wall thickness of a tube to be coupled, said insert having a flange extending radially to overhang said shoulder, and a nut threaded into the tool body to bear against said insert flange and maintain the flange against said shoulder whereby the end of the insert remote from the nut is adapted to bear against the end wall of the tube to be coupled while the ring is advanced into the tool.

3. In combination, a ring setting device comprising a cylindrical body exteriorly threaded at one end, said body having a bore therethrough corresponding substantially to the outer diameter of a tube to be coupled, one end of said bore having a flared conical mouth and the other end having an enlarged portion terminating in a shoulder, an insert within the body having an outer diameter corresponding substantially to the outer diameter of the tube to be coupled, and an inner diameter corresponding substantially to the inner diameter of the tube to be coupled, a flange on said insert adapted to bear against said shoulder, a threaded member in the body adapted to bear against the end of said insert and press the flange on the insert against said shoulder, said threaded member having a bore therethrough corresponding substantially to the inner diameter of the tube to be coupled whereby a mandrel may be inserted through said nut, said insert and into the open end of the tube to be coupled to support the inner wall thereof at the time a cutting ring is fixed to the tube.

4. A ring setting tool for tube couplings having a cutting ring comprising a generally cylindrical body having a removable generally cylindrical insert telescoped therein, the wall thickness of said insert corresponding substantially to the wall thickness of the tube to be coupled, abutting shoulders on said insert and body, and adjusting means to fix the insert in different axial positions within the tool body.

5. A ring setting tool for tube couplings having a cutting ring comprising a generally cylindrical body having a removable generally cylindrical insert telescoped therein, the diameter of said insert corresponding substantially to the outer diameter of the tube to be coupled, abutting shoulders on said insert and body, means to adjustably fix the insert in the body comprising a nut on one side of the insert shoulder and shims on the other side of the insert shoulder.

6. A tool for setting tube coupling rings comprising an elongated metal body, said body being threaded at one end to receive a ring-engaging nut, said body being interiorly threaded at the other end to receive an insert back-up nut, a conical mouth formed interiorly of the body at said one end, said conical mouth terminating in a cylindrical bore, a cylindrical sleeve within said body having an outer diameter corresponding substantially to the bore of the body and an inner diameter corresponding substantially to the inner diameter of the tube to be coupled and a back-up nut to secure the sleeve at a fixed position with respect to said conical mouth.

7. A tool for setting cutting rings for metallic tube couplings, said tool comprising an elongated body, said body being threaded at one end to receive the threads of a ring nut for moving the ring into the body, said body having an axial bore and a conical flaring mouth at one end merging into said bore to reduce the diameter of the ring and cause the cutting edge thereof to enter the outer wall of the tube, said tool body having a shoulder spaced axially from said conical mouth, said tool body being interiorly threaded at the other end thereof, a cylindrical insert within said body having a wall thickness corresponding substantially to the wall thickness of a tube to be coupled, said insert having a portion at one end thereof extending radially to overhang said shoulder and a back-up nut engaging said interior threads at said other end of the tool body to bear against said insert portion and maintain the insert in a fixed position with respect to the conical mouth and the end of the insert remote from the back-up nut being adapted to bear against the end wall of the tube to be coupled while the ring is advanced into the tool.

8. A ring-setting tool for securing a cutting ring to a tube to be coupled prior to the assembly of the tube in a coupling comprising a generally cylindrical body having a tube bore, said bore having a diameter corresponding to the outer diameter of the tube to be coupled, a removable generally cylindrical insert telescoped within said tube bore, said body and insert having abutting shoulders and means to adjust the insert axially within the bore toward and away from the end thereof receiving the tube, and means for moving the ring axially relative to the bore while the tube to be coupled is maintained against the end of said insert.

References Cited in the file of this patent

UNITED STATES PATENTS

| 1,896,371 | Quarnstrom | Feb. 7, 1933 |
| 2,179,127 | Lauer | Nov. 7, 1939 |
| 2,414,184 | Wurzburger | Jan. 14, 1947 |
| 2,791,452 | Watson | May 7, 1957 |